United States Patent
Brotzmann

(10) Patent No.: US 8,557,018 B2
(45) Date of Patent: Oct. 15, 2013

(54) PROCESS FOR IMPROVING ENERGY SUPPLY TO A SCRAP BULK

(75) Inventor: Karl Brotzmann, Amberg (DE)

(73) Assignee: Siemens VAI Metals Technologies GmbH, Linz (AT)

( * ) Notice: Subject to any disclaimer, the term of this patent is extended or adjusted under 35 U.S.C. 154(b) by 262 days.

(21) Appl. No.: 10/553,362

(22) PCT Filed: Apr. 13, 2004

(86) PCT No.: PCT/EP2004/003881
§ 371 (c)(1),
(2), (4) Date: Jun. 13, 2007

(87) PCT Pub. No.: WO2004/092442
PCT Pub. Date: Oct. 28, 2004

(65) Prior Publication Data
US 2008/0041189 A1 Feb. 21, 2008

(30) Foreign Application Priority Data
Apr. 15, 2003 (DE) ................... 103 17 195

(51) Int. Cl.
*C22B 1/00* (2006.01)
(52) U.S. Cl.
USPC .............................. 75/401; 75/414
(58) Field of Classification Search
USPC .................................... 75/401, 414
See application file for complete search history.

(56) References Cited

U.S. PATENT DOCUMENTS

| | | | |
|---|---|---|---|
| 4,334,921 A * | 6/1982 | Hirai et al. ....................... | 75/544 |
| 4,685,112 A | 8/1987 | Michelet et al. | |
| 4,827,486 A | 5/1989 | Brotzmann et al. | |
| 4,908,059 A * | 3/1990 | Hikosaka et al. ............... | 75/573 |
| 5,417,740 A | 5/1995 | Galperin et al. | |
| 5,702,502 A * | 12/1997 | Kundrat et al. .................. | 75/501 |
| 6,030,431 A * | 2/2000 | Deloche et al. .................. | 75/414 |
| 6,402,805 B1 | 6/2002 | Deloche et al. | |
| 2002/0088102 A1* | 7/2002 | Stercho ........................ | 29/401.1 |

FOREIGN PATENT DOCUMENTS

| | | |
|---|---|---|
| DE | 195 21 518 C2 | 8/1996 |
| JP | S62-238318 A | 10/1987 |
| JP | 01219116 A * | 9/1989 |
| JP | 4169784 A | 6/1992 |
| JP | 08157929 | 6/1996 |
| JP | H10-102122 A | 4/1998 |
| JP | 2000 008115 | 8/2000 |
| WO | 9641896 A | 12/1996 |

OTHER PUBLICATIONS

Mietz J. et al., "Stand der verfahrenstechnik fueir das einschmelzen von schrott mit fossiler energie," Stahl und Eisen, Verlag Stahleisen GmbH, vol. 1, No. 7, Jul. 1990, pp. 109-116, 205 (English title: Conditions of processing engineering fueir that melt from scrap iron with fossil energy.

(Continued)

*Primary Examiner* — Jie Yang
(74) *Attorney, Agent, or Firm* — King & Spalding L.L.P.

(57) ABSTRACT

The present invention relates to a process for improving energy supply when heating and melting a scrap bulk wherein a preheated oxidizing gas with addition of fossil fuels melts a channel into the scrap bulk and further energy supply occurs through this channel. A significant improvement of the process is achieved by supplying hot blast to the scrap bulk from the top.

10 Claims, 1 Drawing Sheet

(56) References Cited

OTHER PUBLICATIONS

English Abstract for Japanese Publication No. S62-238318, Oct. 1987.
English Abstract for Japanese Publication No. H10-102122, Apr. 1998.
English Abstract for Japanese Publication No. H04-169784, Jun. 1992.

* cited by examiner

PROCESS FOR IMPROVING ENERGY SUPPLY TO A SCRAP BULK

The invention relates to a process for improving energy supply when heating and melting a scrap bulk. Preheated oxidizing gas with addition of fossil fuels melts a channel into the scrap bulk, and further energy supply occurs through this channel.

At present it is common practice to melt scrap in electric arc furnaces, where burners supply the highest possible amount of fossil energy. The maximum of energy thus supplied, however, is only 10% of the total energy demand.

The importance of melting scrap with fossil energy is summarized in a publication "Stand der Verfahrenstechnik für das Einschmeizen von Schrott mit fossiler Energie" (The state of process technology for melting scrap with fossil energy) in "Stahl und Eisen 1990, p. 109-116". This publication especially mentions intensive efforts to develop new processes for applying fossil energy to melt scrap. On an industrial scale the Two-Converter-Process described on page 113 is at present applied by Nippon Steel in one of their steel works. It is obvious, however, that this is only profitable because of the special conditions in that particular steel mill. The same is true for the EOF-Process as described on page 114. It can only be applied in a limited way because of the complex layout of the equipment, especially concerning the preheating of the scrap in a shaft furnace.

German patent specification DE 195 215 18 C1 describes a process for improving energy supply to a scrap bulk where hot, oxygen-containing gas jets enriched with natural gas or coal melt channels into the scrap bulk that enable further energy supply. The patent description explains that the process according to the invention is not only suited to supply additional energy to an electric arc furnace, but that it may also be used to completely melt a scrap bulk in a hearth-type furnace with only fossil energy and without any electric energy. Fossil energy sources have to be inserted into the scrap bulk in a suitable form. Example: Together with the scrap, approx. 100 kg coal/ton scrap are charged. Part of the coal may also be injected through tuyeres as soon as there is a liquid pool. After melting, the hot blast jet then acts as post combustion jet to supply further energy in order to heat up the bath to the required tapping temperature.

The patent specification describes applications where the hot blast injectors are evenly distributed in the sidewall of the furnace and blow into the furnace at an angle of 100. This guarantees an even melting of the scrap bulk, but also prevents the hot blast jets from hitting refractory after burning through the scrap bulk.

The practical application of this invention led to certain problems. It turned out that the hot gas jets caused an upward flow in the center of the furnace with the result that a chimney was melted into the scrap bulk. The hot off-gases left the scrap bulk and hardly any energy was supplied to the scrap. This led to the formation of an outer ring of unmolten scrap. This effect is apparently aided by the fact, as described in the patent specification, that a cold zone is formed directly in front of the hot blast orifice where the scrap has such a low temperature that it does not even oxidize.

This problem already occurred in a 10-ton pilot furnace. It was to be expected that this problem would increase in a furnace on an industrial scale. A further problem was that the orifices in the sidewall have to be kept open with hot blast after the scrap is melted, with the result that the flatly arranged hot blast jet blows liquid slag onto the opposite wall. In addition, the energy transfer from the post combustion of the process gases to the metal bath via the hot blast jet is affected when there is a layer of liquid slag onto which the hot blast jet blows flatly.

The invention at hand avoids the described disadvantages of the theories of patent specification DE 195 215 18 C1 for melting scrap with fossil energy.

It was a surprising discovery that the described disadvantages of the process under the terms of patent specification DE 195 215 18 C1 are eliminated when hot blast with addition of fossil energy blows onto the scrap bulk from the top. The effect according to the invention is particularly advantageous when hot blast blows onto the scrap bulk from a central top position. Top blowing hot blast according to the invention surprisingly causes a gas stream in the scrap bulk, which utilizes the energy of the gases particularly well and also melts the scrap at the sidewalls in a fast and effective way. The following processes presumably occur in the scrap bulk. The hot blast jet penetrating the scrap bulk effectively heats up the surrounding scrap through gas circulation within the scrap bulk. The gases from this part of the scrap, however, are sucked in by the top blowing jet. The hot gases therefore leave the scrap bulk through an outer ring. As a result there is intensive energy supply in this area, which also heats the scrap in the outer zone from below and facilitates the melting of this part.

Hot blast may be injected from the top through one or more jets. It has proven especially advantageous to divide the hot blast into a central jet with 35 to 65% of the hot blast supply and three to six outer jets that supply the remaining hot blast. Particularly effective, for example, is a central orifice, which supplies 50% of the hot blast, with four orifices for the remaining 50% evenly arranged around it. This design allows for the central orifice to melt a channel into the scrap bulk particularly fast.

In contrast to the central jet, the outer orifices should be arranged at an angle of 10-20°. It turned out that the jets influenced each other at a smaller angle and were contracted to a straight stream. It is also intended by the invention at hand to not only arrange the orifices so that they blow in an outward direction, but to also have a peripheral angle of inclination that makes them blow into the furnace in an angular way. This then causes a certain rotational flow in the furnace.

According to the invention, hot blast should be supplied in such a way that the distance of the orifices to the surface of the scrap, or the melt respectively, may be adjusted. This could be performed through a lance for hot blast supply inserted from the top.

The adjustable design of the orifice or orifices for hot blast supply within the roof has the significant advantage over the known state-of-the-art, where the orifices are installed within the refractory lining of the sidewall of the furnace, that the position of the orifices can be optimally adjusted for preheating the scrap as well as for the post combustion of the process gases during the melting phase. In addition, the orifice can be removed from the roof, when hot blast blowing is disadvantageous at the end of the process.

Figure 1:
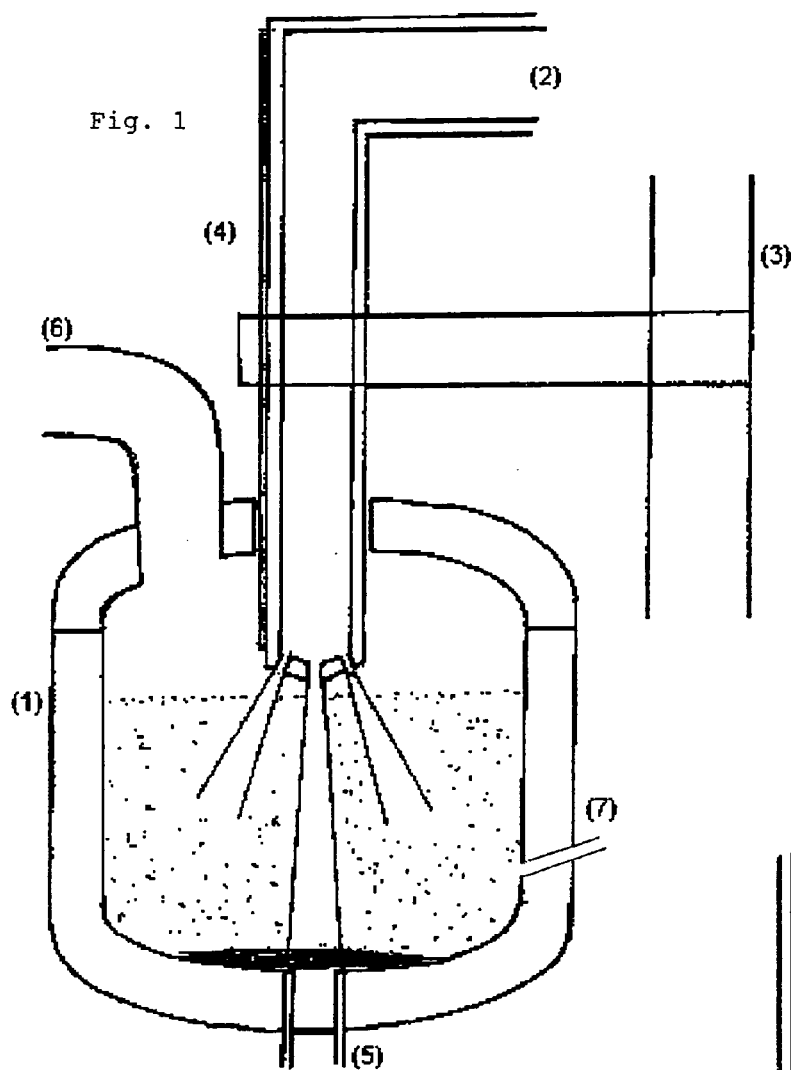
FIG. 1 is a schematic diagram of a hearth-type furnace.

In the process according to the invention for melting scrap, the scrap bulk is preheated in a first phase—hereinafter called phase 1—by means of a hot blast jet with addition of fuel and is in large part melted. In a second phase—hereinafter called phase 2—the iron bath is supplied with energy for melting the residual scrap and for increasing the temperature of the steel to tapping temperature through post combustion of the process gases via the same hot blast jet.

Phase 1 and phase 2 can, of course, not be strictly divided. The transition from phase 1 to phase 2 lasts several minutes. At a total melting time of 30 minutes, phase 1 lasts approx. 15 minutes; transition time is approx. 5 minutes and phase 2 lasts 10 minutes.

In the first phase, fossil energy, e.g. natural gas, is added to the hot blast jet. Surprisingly, it suffices to blow the natural gas close to the hot blast jet through separate feeding. The hot blast lances therefore do not have to be installed as burners. The strong suction capacity of the hot blast jet is obviously sufficient to mix the natural gas with the hot blast.

The cold zone of the scrap directly in front of the hot blast orifice, as described above, is avoided according to the invention by keeping a distance of 0.2 to 0.5 m between the hot blast orifice and the surface of the scrap. The distance may be somewhat larger, if the off-gases leaving the scrap are to be further post combusted before they leave the furnace. Problems with the off-gases, which may occur when scrap is preheated, can thus be substantially reduced.

This involves, however, the disadvantage that the flame temperature is reduced. A high flame temperature is important for the fast melting of a channel and of the scrap as well as for reducing oxidation of the scrap. It could therefore be better to use only a short distance to the surface of the scrap of approx. 30 cm when melting the scrap and to burn the off-gases with small hot blast burners evenly located in the roof.

It is important for the process according to the invention to insert energy into the center of the bottom as fast as possible so that the scrap melted by the hot blast jet does not freeze. Several measures have proved helpful here. The channel in the scrap bulk, through which further energy is supplied to the bottom part of the scrap bulk, has to be melted as fast as possible. The highest possible hot blast temperature, high oxygen enrichment and the highest possible velocity of the hot blast jets are advantageous. It is also useful to insert a high portion of the hot blast, e.g. 50%, via the central jet. At an oxygen enrichment to 40%, a gas jet of 20,000 $Nm^3/h$, with the respective addition of natural gas, can melt a channel into the scrap bulk down to the bottom within two to three minutes.

It turned out that the channel is burned into the scrap bulk faster when there still is some free oxygen in the hot blast flame. Optimal values can be reached at a free oxygen content of 3-10% after full combustion of the energy sources.

It is of further advantage to accumulate the coke on the center of the bottom during charging. Another method is to leave a hot heel of approx. 20% in the furnace. If the furnace is started cold without a hot heel, the coke should be preheated so that it can react with the hot blast jet as soon as possible. It can also be helpful for a first melt in a cold furnace without hot heel to charge aluminum or silicon at an amount of 100 to 200 kg for a 100-ton melt to the impact spot of the central jet at the bottom.

It is of further advantage to adjust the natural gas content added to the hot blast jets in such a way that the composition of the off-gas is slightly reducing. A CO or $H_2$ content in the off-gas of 1-2% should be aimed for. This measure reduces the dioxin content in the off-gases and does not affect the desired free oxygen content in the hot blast jet, since part of the oxygen is consumed by the oxidation of the iron.

It is important in the second phase as well that the quantity of oxygen supplied by the hot blast jet is higher than the amount necessary for the post combustion of the process gases. In order to obtain the maximum post combustion degree, it is essential to supply more oxygen via the hot blast jet than theoretically necessary for the post combustion degree and to supply less oxygen via the bottom tuyeres. At an oxygen bottom blowing rate of 3,000 $Nm^3/h$, for example, 20,000 $Nm^3/h$ hot blast without oxygen enrichment should be supplied.

It has proved important for the optimization of the process to work with different velocities of the hot blast jet and with different levels of the lance during the two blowing phases. It is useful to operate at the highest possible velocity close to sound velocity during the scrap melting phase (at 1,200° C. approx. 750 m/sec). During the second phase, however, with mostly an iron bath, a hot blast velocity of only 40-60% of the sound velocity is chosen (at 1,200° C. approx. 400 m/sec). It is also advisable to position the lance higher during this phase.

The insertion of the lance into the furnace also largely deadens the loud noise caused by a hot blast jet. It has proved especially advantageous to insert the hot blast lance into the furnace more than 50 cm if possible. The off-gases can be released via a separate duct in the roof, as is common practice for electric arc furnaces.

The lance should be moved with a similar device used for inserting the electrodes into an electric arc furnace. The injection according to the invention is advantageous for the connection to the hot blast supply and for a flexible process management, and also for removing the lance towards the end of the refining process.

According to the invention, the hearth-type furnace is equipped with bottom blowing tuyeres for the injection of oxygen, and possibly coal and lime as well. The designs and arrangements known from the bottom blowing converter are being used. Where the converter process, however, uses only a few tuyeres with a large inside diameter of 24 to 28 mm, it is useful for an application in a hearth-type furnace where a hot heel remains to use tuyeres with smaller diameters, even if it is necessary to install a larger number. The inside diameter of the tuyeres should be limited to a maximum 15 mm. Thus a splashing of residual steel and slag after tapping can be avoided. In addition, tuyeres with smaller diameters offer a better protection against a breakthrough of liquid steel in case the cooling of the tuyeres fails.

According to the invention it is also intended to install the tuyeres in an indentation in the bottom to thus achieve a higher coverage after tapping. This arrangement has the advantage that the tuyeres stay covered with liquid steel at all times and do not get into contact with the slag. If tuyeres blow within the slag, deposits can easily be formed that affect the function of the tuyeres.

It is not necessary to use bottom tuyeres for the injection of oxygen. The oxygen may also be injected via so-called "coherent jets", arranged in the sidewall of the furnace as is standard practice.

If the steel requires extremely low nitrogen contents, it is useful to stop hot blast blowing before the end of the melting process. This is advisable at a carbon content in the bath of approx. 0.5%. At this point the lance is drawn out of the roof and the melt is refined with pure oxygen.

When melting the scrap according to the invention by means of a hot blast jet with excess oxygen, part of the iron is slagged. This enables a fast melting of the scrap. Part of the formed FeO remains in the slag; the larger part, however, has to be reduced again. Carbon therefore has to be added to the process. Coal can either be inserted via bottom tuyeres or via orifices in the sidewall of the furnace, as is standard practice in electric arc furnaces. For the process according to the invention two methods of insertion are especially advantageous. The major part is charged together with the scrap in form of coke, preferably breeze, at a quantity of approx. 20-30 kg/ton steel. The other advantageous method consists in injecting the coal together with the hot blast. To prevent the coal from being largely combusted, coarser coal, preferably with a larger grain size of at least some mm, should be used.

As already mentioned, it is advantageous if the hot blast lance is adjusted during melting of the scrap, so that the distance of the lance to the surface of the scrap stays approximately the same. Consequently, the lance has to be lowered during melting of the scrap. It is further advantageous to slowly turn the lance to a degree that corresponds to the distance between two hot blast orifices. With four orifices this would be approx. 90°. When the lance is slowly lowered, the hot blast jet burns rings into the scrap bulk.

Two examples will explain the process according to the invention in detail. In the first example approx. 110 tons of scrap are charged into a 100-ton furnace. Via a hot blast lance with a device for upward and downward motion 40,000 $Nm^3/h$ hot blast of 1,200° C. and 0.9 bar with oxygen enrichment to 40% are supplied. The lance consists of five orifices; one central orifice and four outer orifices with an angle of inclination of 150 against the vertical direction of the jet. The diameter is 20 cm for the central orifice and 10 cm for the outer orifices. Pipes for the injection of natural gas are installed at every orifice. The blowing rate for the natural gas is a total of 5,000 $Nm^3/h$. At the same time 2,000 $Nm^3/h$ oxygen are injected via six bottom tuyeres with a diameter of 12 mm.

In the second example bottom tuyeres are not used at all. Oxygen is supplied via fixed injection systems in the sidewall of the furnace, so-called "coherent jets". This example is based on four injection units, which are evenly distributed in the sidewall of the furnace. Besides oxygen, coal or natural gas can be injected at the same time with these injection units as they are common today. In this example 1,000 $Nm^3/h$ oxygen per injector are supplied; during the first 10 minutes together with 500 $Nm^3/h$ natural gas. After 10 minutes the injection of natural gas is stopped and the process is continued at an oxygen rate of 1,000 $Nm^3/h$ per injector. Hot blast is injected at a total blowing rate of 40,000 $Nm^3/h$ with oxygen enrichment to 40%. Hot blast is supplied via four orifices with a diameter of 140 mm each. The orifices are installed in such a way that the jets blow into the furnace approximately where the coherent oxygen jets hit the bath, in this case approx. 15° against the vertical direction. It is advantageous to transfer this point slightly to the inside, in order to avoid reactions with the refractory. After 20 minutes the blowing rate of the hot blast is reduced to 20,000 $Nm^3/h$. As in the first example, there is no oxygen enrichment during this phase. After 30 minutes the hot blast lance is taken out and the charge is refined via the injectors in the sidewall of the furnace within three minutes.

The process has been described in the patent application at hand as an advantageous application for a hearth-type furnace. It may, however, be applied analogously to a converter.

Figure one shows a schematic diagram of a hearth-type furnace (1) with a hot blast lance (2), which according to the invention is installed within the roof. The hot blast lance is moved by means of a device (3) similar to the electrode holder of an electric arc furnace. The hot blast lance is inserted vertically, until it is located approx. 30 cm above the scrap bulk. The orifice for the hot blast jet consists of a central orifice and four separate orifices with an angle of inclination of 15°. Natural gas is supplied to the hot blast jet via separate pipes (4). Six oxygen bottom tuyeres (5) are installed in the bottom. It is advantageous to arrange the orifices in such a way that they are located below the point of contact of the central hot blast jet. The off-gases are released from the furnace via a duct (6). In FIG. 1 orifices are also installed for oxygen supply via "coherent jets" in the sidewall (7) as an alternative. Natural gas or coal may be supplied simultaneously with the oxygen via four injectors. The lateral orifice system is operated as burner for preheating the scrap during the first phase.

Figure 2:
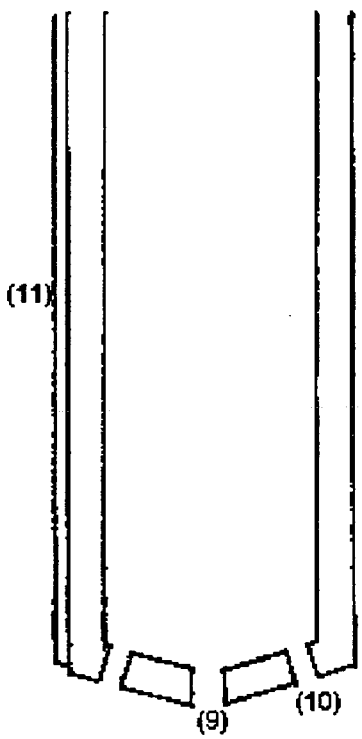
FIG. 2 is a schematic diagram of a hot blast lance.

FIG. 2 exemplifies an advantageous design of the hot blast lance. The lance in question is a lance for melting 110 tons of scrap in a 100-ton hearth-type furnace. During phase 1 40,000 $Nm^3/h$ hot blast are fed to the process at 1,200° C. and a pressure of 0.95 bar via a water-cooled hot blast lance (8) with an inside diameter of 90 cm. The hot blast is distributed to a central orifice (9) with a diameter of 20 cm and four lateral orifices (10) with an angle of inclination of 150 against the vertical direction of the jet. Natural gas is injected at the orifices via separate pipes (11). Since the device is operated at a sub critical flow velocity, a special design of the orifices is not required. They consist of simple circular openings. At an operation close to sound-velocity the hot blast is divided to the separate orifices according to the cross section. When pressure is reduced to approx. 0.4 bar during phase 2, a larger proportion of hot blast is supplied via the central orifice (9). This, however, is desired, because it facilitates the post combustion of the process gases during this phase.

The invention claimed is:

1. Process for improving energy supply when heating and melting a scrap bulk within a vessel having side and top walls, wherein a hot blast of preheated oxidizing gas with addition of fossil fuels melts a channel into the scrap bulk, and further energy supply occurs through this channel and wherein said hot blast is supplied to the scrap bulk from said top wall, wherein said hot blast causes a gas stream in the scrap bulk, the gas stream involving hot gases leaving the scrap bulk through an outer ring within the vessel, thereby heating scrap in said outer ring, wherein the hot blast blows onto the scrap bulk from a central top position, and wherein a high hot blast velocity 500 to 900 m/sec is applied during a first phase and a reduced hot blast velocity approx. 300 to 500 m/sec during a second phase, wherein the hot blast let is enriched with oxygen to 30 to 50% in phase 1, whereas there is no or hardly any oxygen enrichment in phase 2.

2. The process as claimed in claim 1, wherein the hot blast is divided into several separate jets.

3. The process as claimed in claim 1, wherein the hot blast is distributed to a central jet with 35 to 65% of the total amount and several jets outside the central jet for the rest.

4. The process as claimed in claim 1, wherein hot blast is supplied via a vertically adjustable lance.

5. The process as claimed in claim 4, wherein the hot blast lance rotates around a vertical axis.

6. The process as claimed in claim 1, wherein a hot heel remains in the furnace.

7. The process as claimed in claim 6, wherein the hot heel in the furnace makes up 10 to 30% of the melt.

8. The process as claimed in claim 1, wherein oxygen is injected via bottom blowing tuyeres.

9. The process as claimed in claim 8, wherein the bottom blowing tuyeres are installed in an indentation of the furnace bottom.

10. The process as claimed in claim 1, wherein the distance of the hot blast jet to the surface of the scrap is 0.2 to 0.5 m in phase 1 and is adjusted to a distance to the iron bath of at least 3 m during phase 2.

* * * * *